May 14, 1968  N. D. PECK ET AL  3,383,649
METHOD OF ECHO RANGING
Filed March 7, 1962
2 Sheets-Sheet 1
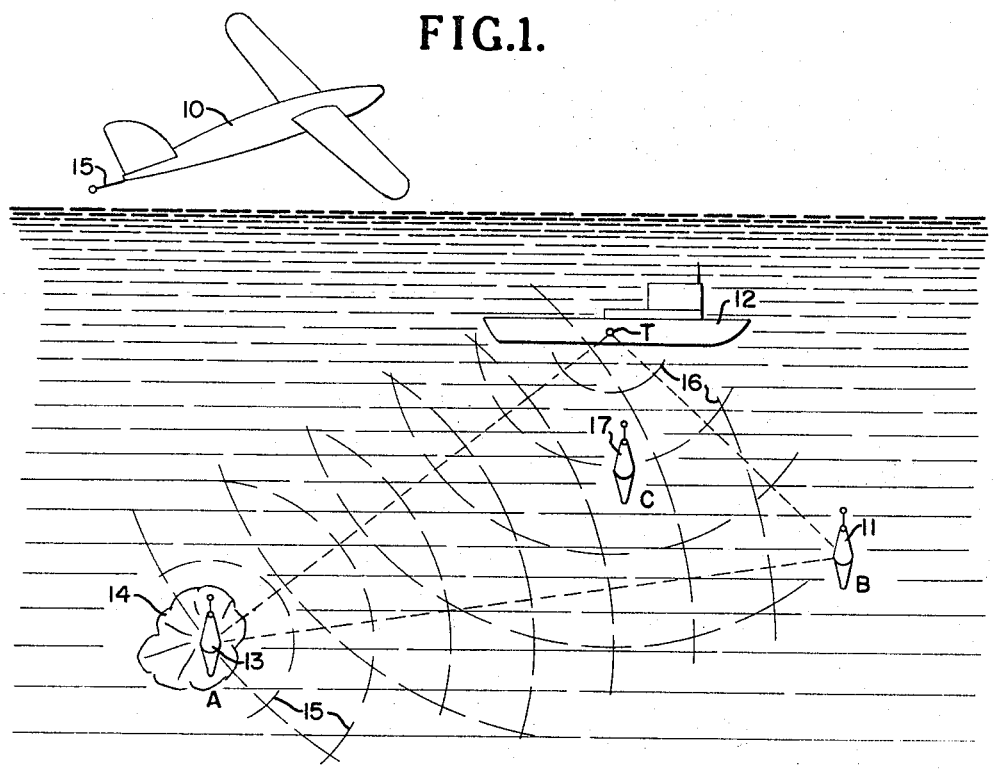
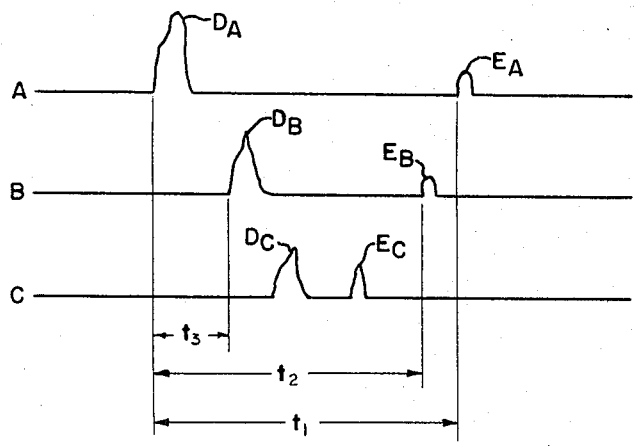
INVENTORS.
NORMAN D. PECK
DONALD M. SALING
THOMAS C. SMITH
BY
ATTYS.
AGENT.

May 14, 1968     N. D. PECK ET AL     3,383,649
METHOD OF ECHO RANGING

Filed March 7, 1962     2 Sheets-Sheet 2

INVENTORS.
NORMAN D. PECK
DONALD M. SALING
THOMAS C. SMITH
BY
ATTYS.
AGENT.

3,383,649
METHOD OF ECHO RANGING
Norman D. Peck, Cornwall-on-Hudson, and Donald M. Saling and Thomas C. Smith, Poughkeepsie, N.Y., assignors, by mesne assignments, to the United States of America as represented by the Secretary of the Navy
Filed Mar. 7, 1962, Ser. No. 178,533
13 Claims. (Cl. 340—3)

ABSTRACT OF THE DISCLOSURE

Underwater objects are detected by placing a plurality of sonobuoys in the area to be searched and producing sound signals in the area by means of one or more explosive charges. The direct and reflected sound signals are received by the sonobuoys, converted to radio signals and transmitted on different frequency channels to a remote station where the signals are recorded to give an indication of the location of the object.

This invention relates to a method of echo ranging and more particularly to a method of echo ranging with explosives in a water medium using existing sonobuoy equipment.

Heretofore, the available underwater detection systems may be classified as either an active or a passive system. In an active system, a sound signal is sent forth to an object and that part of the sound signal which is reflected from the object is returned to a receiver. The passive systems on the other hand, are simply listening devices which function to receive signals emanating from the target itself. In the heretofore available systems utilizing active sonar devices as sound detection and data transmitting equipment, the original sound signal is sent forth to an object from the same point at which the signal echo is received. These systems employ both a directional sound source and a directional receiver so that the exact position of the target might be determined. The passive systems available were either simply of a nondirectional variety, which were concerned with the intensity of the signal from the target, or they were of the more complicated directional variety.

A variety of difficulties have been encountered in attempting to provide a suitable underwater detection system for use with aircraft, especially the fixed wing type aircraft. Completely electronic active ranging systems have been considered and tested for use with aircraft, but the cost, bulk, and weight of such electronic equipment of operationally practical range and power makes their use unfeasible with fixed wing aircraft. Thus, it has been necessary to use only passive ranging systems, which have the desired cost, size and weight but which are inherently inaccurate and short ranged in their tracking capabilities.

It is an object of this invention to provide an improved method of active sonar ranging especially adapted for use with fixed wing aircraft utilizing already existing equipment.

Various other objects and advantages will be apparent from the following description of the invention, and the novel features will be particularly pointed out hereinafter in connection with the appended claims.

In the accompanying drawings:

FIG. 1 is a general illustration of the arrangement of elements necessary to the practice of the invention;

FIG. 2 illustrates a typical recording of the signals received from the sonobuoy elements as arranged in FIG. 1;

Figure 3:
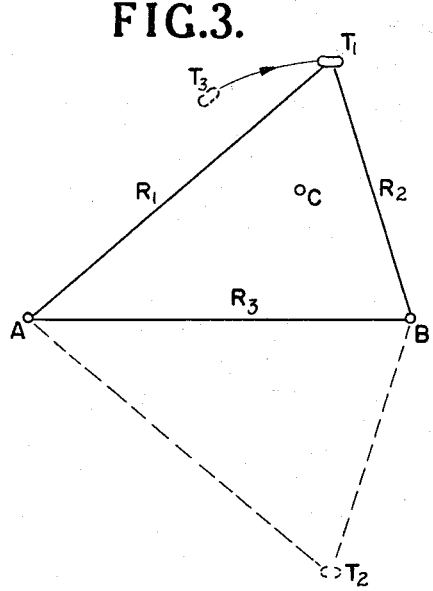
FIG. 3 is a graphical illustration of the theory involved in the echo ranging system method.

In the embodiment of the invention illustrated in FIG. 1, an aircraft 10 of the fixed wing variety flies toward an expected target location point and drops a first sonobuoy or hydrophone 11 in the vicinity of the target 12. With the aircraft continuing on a straight course, a second sonobuoy 13 is laid at a distance of 2,000 yards from the first sonobuoy. The aircraft 10 then reverses its course, that is, returns and flies a straight course over the second sonobuoy 13 on a heading towards the first sonobuoy 11 and drops an explosive charge 14 at each buoy location. At the time each charge is dropped, a recorder (not shown) within the aircraft 10 is turned on to record the data transmitted from the sonobuoys to a receiving antenna 15 on the aircraft.

The equipment employed in the practice of this invention may be any equipment suiting the purposes thereof, which is now well known in the art. The sonobuoys are of the standard type having an underwater transducer element for receiving sound waves; the output from this transducer is used to modulate a high frequency signal which is fed to a transmitting antenna located above the surface of the water. Present sonobuoys, which were primarily designed for passive underwater listening, have certain limitations in the present application. The most serious limitation is their reliability. Also the results obtained, even when functioning properly, tend to be of a somewhat poor quality since these sonobuoys were not designed for the heavier noise levels encountered in active explosive echo ranging such as employed here. Another factor relating to the design of these sonobuoys is their lack of a definite directivity, which results in their being unable to discriminate properly between a bottom reflection or other noise sources in directions other than the desired ones. However, in spite of these limitations, acceptable results may be attained relying on the present equipment available. For best efficiency in the system herein disclosed, the sonobuoy frequency response should be from 200 cycles per second to 1 kilocycle per second for shallow water use and from 1 kilocycle to 3 kilocycles per second for deep water. For improved results, the present sonobuoys may be slightly modified to provide a limited amount of directivity in a horizontal plane and improved response to underwater explosive sound waves.

The signals transmitted from the sonobuoys to the aircraft are received on separate information channels. This is accomplished by having each sonobuoy transmit its information at a separate frequency and then separating these frequencies at the point of reception. The reception of these different frequencies may be accomplished by a single antenna 15 or by providing multiple antennas, one for each sonobuoy. Each of the signals is passed through an amplifier having approximately 30 db amplification; each amplifier contains bandpass filters for selecting the proper frequency and removing undesired frequencies and an automatic volume control circuit. The output of these amplifiers is then rectified and fed to two channels of an appropriate recorder. The function of the bandpass filter is to remove undesired frequencies from the signal received. If it is desired to improve the signal-to-noise ratio of the echo signal, each receiving channel may be modified to first filter the incoming signal at the transmission frequency, then demodulate the signal to remove the transmitting frequency, and finally refiltering the demodulated signal at the optimum sonobuoy response frequency, which, as aforestated, is 1 to 3 kilocycles for deep water operation and 200 cycles to 1 kilocycle for shallow water use.

The recorder used in this operation may be any of the well known recorders which will provide a visible plot of signal strength to elapsed time. An appropriate example of such a recorder is the multi-channel recorder as is presently used to record field strengths in magnetic air detection devices. This recorder moves a paper tape at a constant speed past a plurality of stylus pens; the detected signal strength for each channel is applied to a solenoid coil, the core of which moves an amount proportional to the amplitude of the detected signal. The solenoid core is attached to deflect the stylus pen with its movement and thus indicate on the tape the field strength for any moment of time.

The explosive charge 14 may be any appropriate explosive which is designed to explode under water and is of sufficient strength to produce the necessary acoustical waves and yet not so powerful as to destroy or damage sonobuoys in the immediate vicinity. Explosive charges of the type now used in practice depth charges sufficiently fulfill the aforesaid requirements. In certain instances, as in shallow water operation, an acoustical directivity of the explosive charge will be desired to overcome limiting conditions due to bottom reflections. Such directivity may be given to the explosive charge by any well known method such as the use of an explosive line charge or primer cord which gives substantial horizontal directivity.

In essence, the operation of the instant invention is as follows. The explosive charge 14 upon detonation near the sonobuoy 13 produces a sound wave 15 which travels outward from the point of explosion in a circular manner to impinge upon the target 12 and the sonobuoys. Upon striking the target the sound waves are reflected by the target and travel out from the point of impingement in circular fashion, as before, to result in an echo sound wave 16 which will impinge upon the sonobuoys 11 and 13. This echo will arrive at the different sonobuoy positions at a time determined by the speed of sound in the water and the distance that each sonobuoy is located from the target. The underwater sound signals received by each sonobuoy are recorded in appropriate time relation on the moving tape. FIG. 2 shows the tracks as they would appear on the recorder tape for each of three sonobuoys. Track A would represent the signal received from the sonobuoy 13, track B that received from the sonobuoy 11, and track C that from a third sonobuoy 17, the function of which will later be explained. Upon explosion of the charge 14, the sonobuoy 13 almost immediately detects the direct sound wave therefrom and transmits this data to the receiving equipment in the aircraft where it is recorded on track A of the recorder as the pip $D_A$. The direct wave from the explosion also travels to the second sonobuoy 11, where it is detected and subsequently recorded on track B as the pip $D_B$. The difference in the position of $D_A$ and $D_B$ on their respective tracks represents the time difference between the arrival of the sound wave at these two sonobuoys; this time difference in turn represents the amount of time required for the direct acoustic wave to travel from the point of explosion, approximately at the sonobuoy 13, to the sonobuoy 11 placed some predetermined distance way, in this case, a distance of 2,000 yards. The signal sound wave reflected from the target 12 returns as an echo signal first to the sonobuoy 11, since this sonobuoy is closer to the target, and then to the sonobuoy 13; the respective arrivals of the echo wave is recorded on the respective tracks as the pips $E_A$ and $E_B$, respectively. By determining the time differences displayed by the tape recordings and comparing these values, the range and bearing to the target may be determined.

The determination of the range and bearing to the target is best illustrated by reference to FIG. 3, which illustrates a typical solution applied to the recorded data. Considering that the point of explosion of the charge 14 is coincident with the position of the sonobuoy 13, the time difference $t_1$ between the pip $D_A$ and the echo pip $E_A$ is the measure of the time required for the sound wave to travel twice the distance, that is out and back, from the sonobuoy 13 to the target 12. Thus, the range $R_1$, to the target from the sonobuoy 13 is established by solving the equation, $$R_1 = \frac{t_1 v}{2} \qquad (1)$$

wherein $v$ represents the velocity of sound in the surrounding water. The difference in time $t_2$ between the pip $D_A$ and the echo pip $E_B$ received at the sonobuoy 11 represents the time required for the sound wave to travel from sonobuoy 13 out to the target 12 and then be reflected back to the sonobuoy 11. Thus, the range to the target from the sonobuoy 11 is determined by solving the equation, $$R_2 = t_2 v - R_1 \qquad (2)$$

The distance between the sonobuoys 11 and 13 has been predetermined so that the three sides of the triangle formed by the two sonobuoys and the target are now known; therefore, the exact position of the target is determined. The time difference $t_3$ between the pips $D_A$ and $D_B$ may also be used to determine the exact distance between the two sonobuoys 11 and 13 if this distance is in doubt. By plotting the determined distances on an appropriate scale, as shown in FIG. 3, first setting out the known distance $R_3$ between the two sonobuoys $R_3$ and striking arcs corresponding to the distances $R_1$ and $R_2$, an appropriate plot of the target position relative to the sonobuoys is obtained.

At this point it should be noted that the ranges $R_1$ and $R_2$ actually determine two different target positions, as represented by the target positions $t_1$ and $t_2$ in FIG. 3. Two different methods of solving this ambiguity are easily employed. One method is to fly the aircraft over either of the two indicated target positions and drop a further charge. If the time difference between the reception of the direct wave from this further charge and the echo signal is small, the true target is known to have been selected. If the time difference is large between the direct and the echo signal, then the true target position is known to be that which was not selected. This method gives satisfactory results for solving the ambiguity when the target position does not lie close to the extended line between the two sonobuoys. In employing this method, the data need not be recorded but may be determined by the operator from merely listening to the sonobuoy response.

The second method which may be employed to solve the ambiguity is to place a third sonobuoy 17 at some distance away from the line of the first two sonobuoys. This sonobuoy will provide a third track on the recorder which may be used to solve the ambiguity. The operator need only observe the position of the echo pip $E_C$ with respect to the echo pips on the other sonobuoys, since the echo sound wave will arrive first at the sonobuoy which is closest to the target. Alternatively, the aircraft may also drop another charge at any position and again observe the data from the three sonobuoys to solve the ambiguity.

In comparing the data appearing on the recorder, various other well known methods of comparison may be employed other than the plotting board and compass method previously described. For example, the use of various precomputed tables may be used to determine the ranges and bearings indicated by the time differences displayed on the recording sheet.

Figure 4:
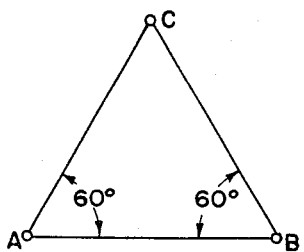
FIG. 4 illustrates a sonobuoy arrangement having particular utility in practicing the instant invention.
Figure 5:
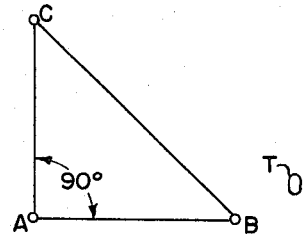
FIG. 5 illustrates an alternative sonobuoy arrangement, which is particularly useful in the practice of this invention.

FIGS. 4 and 5 represent two alternative arrangements of sonobuoys which have proved especially useful both to solve ambiguities in target position and in maintaining a continuous track of the target. FIG. 4 illustrates an arrangement of three sonobuoys placed in predetermined positions to form an equilateral triangle with the desired spacing of 2,000 yards between each of the sonobuoys.

With this arrangement, the tracking aircraft may drop a charge on any one of the three and solve the resulting data with respect to either of the other two sonobuoys. The data recorded from the third sonobuoy is always available to resolve ambiguous target position. Further, with this arrangement, two different solutions may be quickly computed by the operator from the existing data to provide a check upon the target location for each charge exploded; for example, a charge dropped at point A will provide a solution with respect to both B and C. The aircraft may also fly a circular path thus continually passing over each of the three sonobuoys in sequence and dropping charges to maintain an almost continuous surveillance of the target's movements.

FIG. 5 shows a triangular arrangement of the sonobuoys in the form of a right triangle with two equal legs thereon, each being the desired predetermined distance of 2,000 yards between sonobuoys. The advantages of the right triangle arrangement are much the same as those discussed in relation to the arrangement of FIG. 4. A charge dropped at sonobuoy B or sonobuoy C is solved in relation to the sonobuoy A; whereas a charge dropped at point A is solved in relation to either points B or C or both of them to provide the required check. For a solution with respect to any two sonobuoys, the third sonobuoy provides a means of solving the ambiguities.

A further advantage of this active echo ranging system will be explained with reference to FIG. 3 and FIG. 6. The passive underwater detection capabilities of the sonobuoy may be employed in the period between the dropping of charges to provide a degree of tracking of a moving target. A moving ship produces distinct noise patterns which may be detected by the sonobuoys. Each specific noise created by the moving target will arrive at the sonobuoys at different times depending upon the position of the target in relation to the sonobuoys. By recording and observing these noises the direction of movement of a target may be determined.

Figure 6:
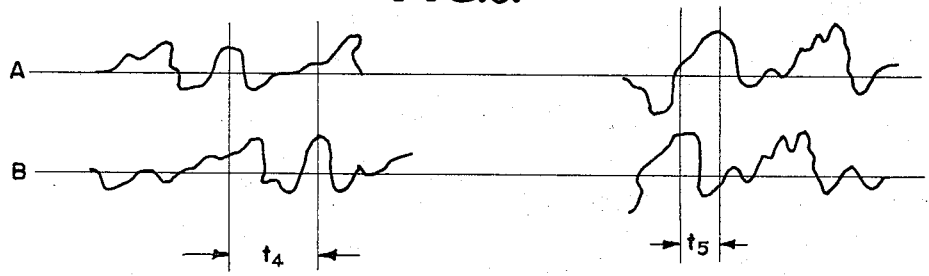
FIG. 6 illustrates a typical recording made utilizing the passive tracking capabilities of a pair of sonobuoys.

FIG. 6 illustrates a recording of the noises of the target when its position in relation to the sonobuoys is such as that shown by the position $T_3$ in FIG. 3; since in this position the target is closer to the sonobuoy A, a particular noise arrives thereat sooner than the same noise would arrive at the sonobuoy B. The time difference of arrival $t_4$ on the recording is an indication of the bearing of the target with relation to the position of the sonobuoys. As the target moves along a track towards the sonobuoys B, this time difference will become less and finally be reversed when the target has reached a bearing, such as illustrated by the target position $T_1$ in FIG. 3. The difference in noise reception of the two channels as recorded for target position $T_1$ is illustrated by the time difference $t_5$ in FIG. 6. Thus, by observing these passive recordings, the change in relative bearing of the target may be determined between the dropping of charges.

A further method of obtaining a course determination of the target position which gives greatly extended range to the system involves the dropping of an explosive charge in the expected vicinity of the target. The operator in this case is required to mark the recorder tape upon explosion of the charge. The time of arrival of the direct wave at the sonobuoys determines the position of the charge in relation thereto. The arrival of the echo waves, which is later in time, is then used to coarsely determine the position of the target by comparing the time difference of arrival at the two sonobuoys with the position of the charge.

Another method of extending the range of detection involves the use of three or more sonobuoys placed in predetermined positions. The charge may then be exploded at any point; for a maximum range of the system, this would be close to the expected target position. The differences in the time of arrival of the echo at each sonobuoy would present a hyperbolic solution to the position of the object. However, the hyperbolic solution is extremely complicated and would not be practical for use with the existing equipment since the solution of the problem would depend upon the operator. With appropriate computing means this method would become practical.

Although this system has been disclosed in relation to its use by fixed wing aircraft, it is to be understood that this system is not limited to use by aircraft but may be employed under any conditions. This system does, however, provide a very effective method of active echo ranging which may be employed by fixed wing aircraft in locating underwater targets, such as submarines.

It is to be understood that various changes in the details, which have been herein described and illustrated in order to explain the nature of the invention, may be made by those skilled in the art, within the principle and scope of the invention as expressed in the appended claims.

What is claimed is:

1. The method of underwater echo ranging for determining the presence of a submerged target comprising the steps of flying an aircraft to the general suspected vicinity of the target, dropping a plurality of underwater listening devices at predetermined positions in relation to one another, exploding an underwater charge at a predetermined position in relation to the predetermined positions of said underwater listening devices, sensing the direct underwater sound so produced and resultant target reflected sound waves, recording on a time scale recorder the reception by each said listening device of the direct and the target reflected sound waves resulting from said charge, and comparing the times of reception by each said listening device to determine the position of said target.

2. The method of underwater echo ranging for determining the presence of a submerged target comprising the steps of directing an aircraft to the general suspected vicinity of the target, dropping a plurality of underwater listening devices at predetermined positions in relation to each other, producing an underwater sound at a predetermined position in relation to the predetermined positions of said underwater listening devices, detecting the direct underwater sound so produced and resultant target reflected sound waves, recording the times of reception by each of said listening devices of both the direct and the target reflected sound waves produced by said underwater sound, whereby the position of an underwater target may be determined in relation to the positions of said underwater listening devices.

3. A method of underwater echo ranging to determine two ambiguous positions of an underwater target comprising the steps of piloting an aircraft to the suspected vicinity of the target, dropping a pair of underwater listening devices a predetermined distance apart, exploding an underwater charge in close proximity to one of said pair, detecting the sound waves produced directly by said charge and the resultant target reflected sound wave, separately recording the direct and reflected sound waves produced by said charge and received by each of said pair, and comparing the difference between the recorded direct sound wave from said charge and the recorded reflected sound wave from said target from each of said pair to determine the two ambiguous positions of said target.

4. The method of claim 3 further comprising placing a third underwater listening device at a predetermined distance along a line normal to a line joining said pair of underwater listening devices, detecting at least the reflected sound waves at said third underwater listening device, separately recording the sound waves from said charge received by said third underwater listening device, and comparing the time of arrival of said reflected sound waves from said target at said third listening device with the time of arrival of the reflected sound wave at one of said pair of listening devices for resolving the ambiguity between the two possible target positions.

5. The method of underwater echo ranging of claim 3 further comprising exploding a second underwater charge in close proximity to one of the two ambiguous positions of said target, and comparing the time difference between the direct sound wave from said second underwater charge and the reflected sound wave from said second underwater charge received by one of said pair of underwater listening devices to determine the unambiguous position of said target.

6. The method of underwater echo ranging to locate the position of an underwater target from a fixed wing aircraft comprising the steps of directing an aircraft to the general suspected vicinity of the target, air-dropping a pair of sonobuoys a predetermined distance apart on the surface of the water, exploding a sound initiating charge in proximity to one of said pair of sonobuoys, detecting the direct and target reflected sound waves at said sonobuoys, separately recording the sound received by both of said sonobuoys both directly from said charge and indirectly from a reflection from the target, and comparing the times of arrival of the direct and the indirect sounds from said charge at both of said sonobuoys to determine the two ambiguous positions of the target relative to said sonobuoys.

7. The method of claim 6 further comprising placing a third sonobuoy at a position removed from the line joining said pair of sonobuoys, sensing the indirect sound waves at said third sonobuoy and one of said pair of sonobuoys, separately recording the indirect sound received by said third sonobuoy and comparing the time of arrival at said third sonobuoy of said indirect sound with the time of arrival of said indirect sound at said one of said pair of sonobuoys, whereby the correct position of the two ambiguous positions of the target with respect to said pair of sonobuoys is determined.

8. The methd of claim 6 further comprising placing and exploding a second charge at one of said two ambiguous positions, detecting at said sonobuoys the direct and indirect sounds resulting from said second charge, recording the direct and the indirect sounds received by said sonobuoys from said second charge, and comparing the times of arrival of the direct and the indirect sounds to determnie the correct position of the two ambiguous positions of the target.

9. The method of underwater echo ranging to an underwater target comprising flying an aircraft to the general suspected area of the target dropping a plurality of sonobuoys a predetermined distance apart, exploding an underwater charge to produce sound waves, detecting the direct and resulting target reflected sound waves at said sonobuoys, and comparing the times of arrival of both the sound waves directly from said charge and the reflected sound waves from said target, whereby the two ambiguous positions of said target with relation to said sonobuoys is determined.

10. The method of tracking an underwater target comprising placing a plurality of sonobuoys a predetermined distance apart, exploding a plurality of underwater charges at different time intervals, detecting the direct and resulting target reflected sound waves at said sonobuoys, and comparing the times of arrival of the sound waves directly from each said charge and the reflected sound waves from said target, whereby the two ambiguous positions of said target with relation to said sonobuoys is determined for each charge exploded.

11. The method of claim 10 further comprising comparing the times of arrival of the sounds produced by said target at each of said sonobuoys to determine the relative movement of said target during the periods when no charge is exploded, whereby a continous track of the approximate position of said target may be maintained.

12. The method of claim 10 wherein three sonobuoys are placed a predetermined distance apart to form an equilateral triangle.

13. The method of claim 10 in which three sonobuoys are placed a predetermined distance apart, said three sonobuoys being placed to form a right triangle having two of said sonobuoys placed at equal distances from said third sonobuoy.

References Cited
UNITED STATES PATENTS

| | | | |
|---|---|---|---|
| 1,785,307 | 12/1930 | Hammond | 340—6 |
| 2,402,391 | 6/1946 | Goodard | 340—3 |
| 2,448,713 | 9/1948 | Hansell | 340—2 |
| 2,465,696 | 3/1949 | Paslay | 340—2 X |
| 2,587,301 | 2/1952 | Ewing | 340—6 |
| 3,112,484 | 11/1963 | McKeown | 340—6 X |
| 3,116,471 | 12/1963 | Coop | 340—2 |

RICHARD A. FARLEY, *Primary Examiner.*

CHESTER L. JUSTUS, KATHLEEN H. CLAFFY,
*Examiners.*